Jan. 27, 1959 G. V. WOODLING 2,871,032
FLUID CONDUIT SWIVEL ADAPTER COUPLING ASSEMBLY
Filed Feb. 2, 1951

INVENTOR.
George V. Woodling.

United States Patent Office 2,871,032
Patented Jan. 27, 1959

2,871,032

FLUID CONDUIT SWIVEL ADAPTER COUPLING ASSEMBLY

George V. Woodling, Cleveland, Ohio

Application February 2, 1951, Serial No. 209,025

2 Claims. (Cl. 285—31)

My invention relates in general to fluid connections and more particularly to fluid conduit interconnection means between two fixedly spaced threaded ports.

Another object of this invention is the provision of a fluid conduit interconnection means having a tube with threaded coupling members at the ends thereof which are adapted to be threadably connected respectively to two fixedly spaced threaded ports having their axes lying in substantially parallel spaced planes, taken in combination with means in said fluid conduit interconnection means to vary the length thereof for aligning the threaded coupling members and the threaded ports to facilitate the easy mounting of the threaded coupling members in said ports.

Another object of this invention is the provision of a fluid conduit interconnection means having a tube with threaded coupling members at the ends thereof which are adapted to be threadably connected respectively to two fixedly spaced threaded ports having their axes lying in substantially parallel spaced planes, taken in combination with an eccentric adapter to vary the distance between the threaded ports to facilitate the easy mounting of the threaded coupling members in the said ports.

Another object of this invention is the provision of an eccentric adapter to convert a pipe threaded port over to a port having machine threads and adapted to receive a swivel tube coupling.

Other objects and a fuller understanding of this invention may be had by referring to the following description and claims, taken in conjunction with the accompanying drawing, in which:

Figure 1:
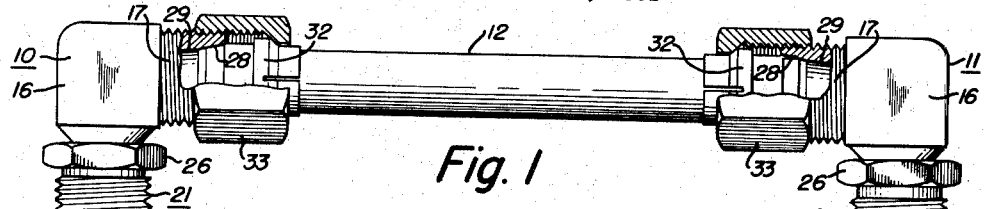
Figure 1 is a side elevational view, partly shown in section, of a fluid conduit interconnection means embodying the features of my invention, the unit being shown with the tube connecting nuts and sleeves being turned "finger tight"

With reference to Figure 1, my fluid conduit interconnection means comprises two identically constructed swivel couplings 10 and 11, which are connected to opposite ends of an interconnecting tube 12. Each of the swivel couplings comprises an intermediate body 16 having a swinging arm 17 extending horizontally therefrom and a rotating arm 18 extending vertically therefrom. The intermediate body and the two arms 17 and 18 have a passageway therethrough to provide fluid communication. The rotating arm 18 has a cylindrical outer surface which is generated about a vertical axis and the swinging arm 17 has a threaded outer surface which is generated about a horizontal axis. The two axes are substantially at right angles to each other. Surrounding the rotating arm 18 is a threaded sleeve 21 having machine threads. The upper arm of the threaded sleeve 21 terminates into a nut portion 26 and the lower end of the threaded sleeve terminates into a contractible ring 22.

The threaded sleeves on the rotating arms 18 are adapted to be threadably connected respectively to two spaced threaded ports 23 and 24 of an eccentric adapter 30 having pipe threads 31 threadably connected to the threaded ports 34 and 35, respectively, of a hydraulic unit 25. The hydraulic unit 25 may be a panel upon which hydraulic units or parts are mounted or the hydraulic unit 25 may be a portion of a hydraulic pump, valve or cylinder. The axes of the two threaded ports 23 and 24 lie substantially in parallel spaced planes. Each of the threaded ports comprises machine threads adapted to receive the machine threads on the threaded sleeve 21. The bottom of each of the threaded ports 23 and 24 terminates into a conical camming surface 28 and a conical wedging surface 29. As the threaded sleeve 21 is threadably connected to the threaded port, the contractible ring portion 22 is cammed into the conical camming surface 28 and is shrunk about the rotating arm 18 to thereby anchor the rotating arm 18 into the threaded port. The end of the rotating arm 18 is wedgingly forced into the conical wedging surface 29 and provides a secondary seal against fluid leakage in addition to the primary seal afforded by the contractible ring 22 contractibly shrinking or engaging the rotating arm 18.

The construction of the swivel tube couplings 10 and 11 and the threaded ports into which they are threadably received is substantially the same as that shown in my pending application Serial No. 198,857, filed December 2, 1950 for "Flareless Swivel Fitting."

The conical camming surface 28 in each threaded port 23 and 24 makes an angle of approximately 10 to 15 degrees with the vertical axis of the threaded port and the conical wedging surface makes an angle of approximately 2 to 6 degrees with the vertical axis of the threaded port. The contractible ring portion 22 is adapted to spring back from the rotating arm 18 when the threaded sleeve 21 is loosened, so that the threaded sleeve 21 may be threadably assembled or disassembled from the threaded port by merely turning the nut portion 26.

The intermediate body 16 and the swinging arm 17 and rotating arm 18 may be referred to in the claims as first swivelably connected means and the threaded sleeve 21 and the contractible ring 22 may be referred to in the claims as second swivelably connected means. The contractible ring 22 upon engaging the rotating arm 18 provides for securing the threaded sleeve 21 to the rotating arm.

The swinging arms 17 are so designated because they may be swung around by rotating the rotating arm 18 within the threaded sleeve 21 when the threaded sleeve is threadably loosened within the threaded port. The swinging arm 17 is provided with a longitudinally extending bore to retractibly receive the end of the tube. The construction of the retractibly receiving bore is provided with a conical camming surface 28 and a conical wedging surface 29, which are identical to the corresponding surfaces in the threaded ports of the eccentric adapters.

Surrounding each end of the tube 12 is a contractible sleeve 32 adapted to connect the end of the tube to the swinging arm when a coupling nut 33 is tightened.

In Figure 1, the coupling nut 33 for each of the tube couplings 10 and 11 is shown "finger tight." In this position, the vertical axes of the rotating arms 18 are spaced apart for a distance which is greater than the distance between the vertical axes of the threaded ports 23 and 24. As the coupling nuts 33 are turned by a wrench for tightening same, the contractible sleeves 32, after engaging the end of the tube 12, operate to urge the end of the tubes farther into the bores of the swinging arms to shorten the distance between the vertical axes of the rotating arms, thereby aligning the vertical axes of the rotating arms with the vertical axes of the threaded ports. This position is shown in Figure 2.

The end of the contractible sleeve 32 which is cammed into the conical camming surface 28, is identical to the contractible ring 22 of the threaded sleeve 21. The end of the tube as it is contactibly forced into the end of the bore of the swinging arm is wedgingly forced into the conical wedging surface 29 to make a secondary seal of fluid pressure in addition to the primary seal made by the contractible sleeve engaging the end of the tube as it is cammed into the conical camming surface 28.

Figure 2:
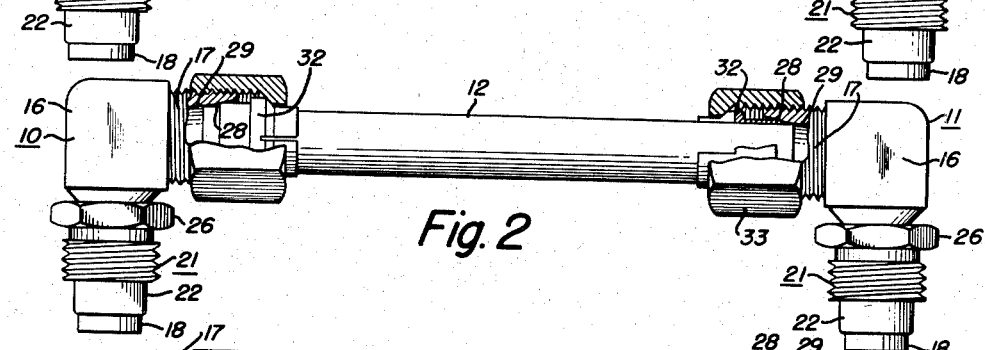
Figure 2 is a view similar to Figure 1 but with the tube connecting nuts and sleeves being drawn up "wrench tight"
Figure 3:
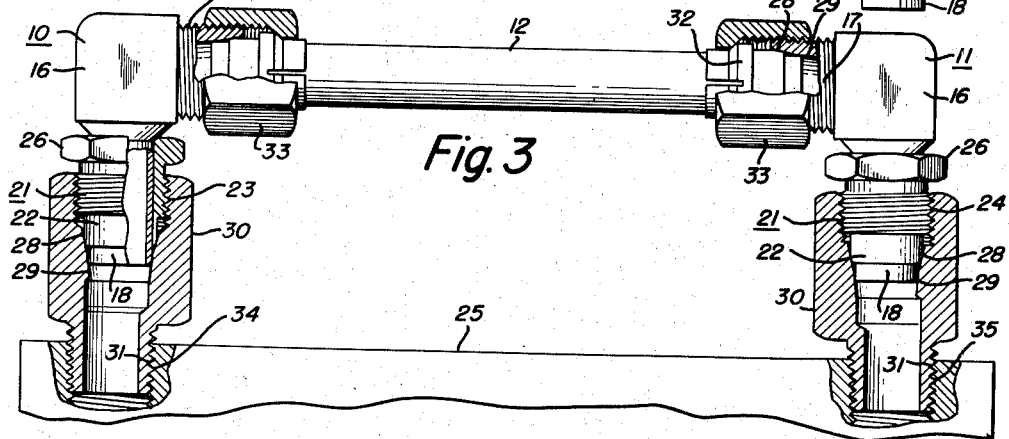
Figure 3 is a view similar to Figure 2 with the tube couplings at opposite ends thereof being threadably connected to two spaced ports in eccentric adapters threadably connected to two pipe threaded ports in a hydraulic system.
Figures 5, 8:
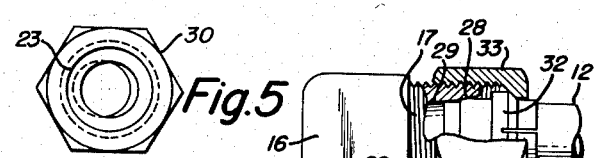
Figure 5 is a plan view of the adapter shown in Figure 4.
Figure 8 is a plan view of the modified adapter shown in Figure 7.
Figure 4:
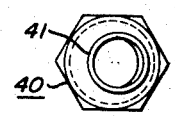
Figure 4 is a side elevational view of an eccentric adapter embodying the features of my invention.

After the fluid conduit interconnection means is assembled as shown in Figure 2, it is ready to be threadably connected into the threaded ports of the adapters 30. In screwing the threaded sleeves 21 into the threaded ports of the adapters 30, if they are not quite in vertical alignment with each other, the operator may turn one or both of the eccentric adapters 30 in order to make the thread engagement therebetween in perfect alignment. When the threads are in perfect alignment, the threaded sleeves 21 may then be threadably connected into the adapters 30. The Figures 4 and 5 show, respectively, side and top views of the adapter and illustrate the eccentricity so that as the adapters 30 are turned into the threaded pipe ports 34 and 35, the distance between the vertical axes of the adapter ports 23 and 24 is varied to accommodate the easy insertion of the threaded sleeves 21 therein.

Figure 6:
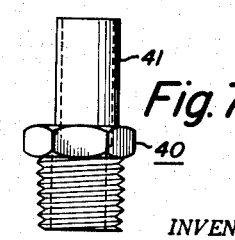
Figure 6 is a view of the left-hand end only of the fluid conduit connection means with the tube coupling mounted in a modified eccentric adapter.

In Figure 6 I show a modified arrangement of an eccentric adapter wherein I employ a pipe nipple 40 having an eccentrically disposed tubular element 41 extending upwardly therefrom. In this assembly, the rotating arm 42 of the coupling member is identical in construction to the swinging arm 17. The upper end of the eccentrically disposed tubular element 41 is connected to the rotating arm 42 by means of a sleeve 32 and the nuts 33, which are identical to the sleeves 32 and the nuts 33 which connect the ends of the tube 12 to the swinging arms 17 of the coupling members. In mounting the assembly as shown in Figure 6, the nipple 40 is first threadably connected into the port 37 and, in tightening, the nipple 40 is turned to such a position that the vertical axis of the eccentrically disposed tubular element 41 is in perfect alignment with the vertical axes of the rotating arms 18, after which the contractible sleeve 32 and the coupling nut 33 are tightened to produce a fluid seal therebetween. In Figure 6, the contractible sleeve 32 provides for connecting the nipple 40 to the rotating arm 42 and the nipple and sleeve may be referred to in the claims as second swivelably connected means.

Figure 7:
Figure 7 shows a side elevational view of the modified adapter shown in Figure 6.

It is to be noted that both types of adapters comprise a pipe threaded portion and a hollow portion adapted for connection to a fluid coupling member, the hollow portion being eccentrically disposed with the pipe threaded portion. The hollow portion for the adapter in Figures 4 and 5 comprises the body with the conical camming surface 28 and the conical wedging surface 29, and the hollow portion for the adapter in Figures 6, 7 and 8 comprises the tubular element 41.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. Fluid conduit interconnection means between two fixedly spaced pipe threaded ports, said ports having axes respectively lying in substantially parallel spaced planes, said conduit means including eccentric adapters respectively mounted in said pipe threaded ports and having adapter ports eccentrically disposed with respect to said pipe threaded ports, said conduit means also including a straight metal tube, and first and second end coupling means respectively connected to the ends of the tube and mountable in said adapter ports, each said coupling means comprising first and second swivelably connected means, said first swivelably connected means comprising a hollow intermediate body portion having a hollow swinging arm and a hollow rotating arm, respectively, extending therefrom and fixedly connected therewith, said arms having external surfaces generating respectively about axes defining substantially a right angle, said second swivelably connected means comprising threaded means and contractible ring means, said threaded means being threadably turnable in said adapter ports, said contractible ring means securing said threaded means to said rotating arms, said swinging arms having longitudinally extending bores to retractibly receive the ends of the tube, connection means for each swinging arm to anchor the end of a tube thereto, each said connection means comprising a contractible sleeve for contractibly engaging the end of the tube, said sleeves upon engaging the ends of the tube retractibly urging the tube farther into the bores of the swinging arms to shorten the distance between the rotating arms and aligning the threaded means with the adapter ports, said adapters being threadably turnable in said pipe threaded ports and aligning said adapter ports with said threaded means.

2. Fluid conduit interconnection means between two fixedly spaced pipe threaded ports, said ports having axes respectively lying in substantially parallel spaced planes, said conduit means including eccentric adapters respectively mounted in said pipe threaded ports and having adapter elements eccentrically disposed with respect to said pipe threaded ports, said conduit means also including a straight metal tube, and first and second end coupling means respectively connected to the ends of the tube and mountable in said threaded ports, each said coupling means comprising first and second swivelably connected means, said first swivelably connected means comprising a hollow intermediate body portion having a hollow swinging arm and a hollow rotating arm, respectively, extending therefrom and fixedly connected therewith, said arms having external surfaces generating respectively about axes defining substantially a right angle, said second swivelably connected means comprising said adapter elements and contractible ring means, said contractible ring means securing said adapter elements respectively to said rotating arms, said swinging arms having longitudinally extending bores to retractibly receive the ends of the tube, connection means for each swinging arm to anchor the end of a tube thereto, each said connection means comprising a contractible sleeve for contractibly engaging the end of the tube, said sleeves upon engaging the ends of the tube retractibly urging the tube farther into the bores of the swinging arms to shorten the distance between the rotating arms and aligning the rotating arms with the adapter elements, said adapters being threadably turnable in said pipe threaded ports and aligning said adapter elements with said rotating arms.

References Cited in the file of this patent

UNITED STATES PATENTS

Re. 22,713    Howe _____ Jan. 22, 1946

(Other references on following page)

UNITED STATES PATENTS

| | | |
|---|---|---|
| 1,046,175 | Goodall | Dec. 3, 1912 |
| 1,057,289 | Sieber | Mar. 25, 1913 |
| 1,122,422 | Ross | Dec. 29, 1914 |
| 1,295,106 | Bowlzer | Feb. 25, 1919 |
| 2,393,581 | Wentworth | Jan. 22, 1946 |
| 2,442,103 | Thomas | May 25, 1948 |
| 2,455,470 | Collison | Dec. 7, 1948 |
| 2,472,872 | Woodling | June 14, 1949 |
| 2,541,141 | Woodling | Feb. 13, 1951 |
| 2,564,428 | Ford | Aug. 14, 1951 |

FOREIGN PATENTS

| | | |
|---|---|---|
| 322,882 | Great Britain | Dec. 19, 1929 |